(12) United States Patent
Hines et al.

(10) Patent No.: US 12,359,922 B2
(45) Date of Patent: Jul. 15, 2025

(54) VEHICLE NAVIGATION

(71) Applicant: Commonwealth Scientific and Industrial Research Organisation, Acton (AU)

(72) Inventors: Thomas Hines, Victoria (AU); Kazys Stepanas, Victoria (AU); Fletcher Talbot, Victoria (AU); Inkyu Sa, Victoria (AU); Emili Hernandez, Victoria (AU); Navinda Kottege, Victoria (AU); Jake Lewis, Victoria (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 25 days.

(21) Appl. No.: 17/482,942

(22) Filed: Sep. 23, 2021

(65) Prior Publication Data

US 2022/0196410 A1    Jun. 23, 2022

(30) Foreign Application Priority Data

Dec. 21, 2020    (AU) .................................. 2020904756

(51) Int. Cl.
| | |
|---|---|
| *G01C 21/34* | (2006.01) |
| *G01C 21/00* | (2006.01) |
| *G05D 1/246* | (2024.01) |
| *G06T 15/08* | (2011.01) |
| *G06V 20/64* | (2022.01) |

(52) U.S. Cl.
CPC ..... *G01C 21/3407* (2013.01); *G01C 21/3807* (2020.08); *G01C 21/3826* (2020.08); *G05D 1/2464* (2024.01); *G06T 15/08* (2013.01); *G06V 20/64* (2022.01)

(58) Field of Classification Search
None
See application file for complete search history.

(56) References Cited

U.S. PATENT DOCUMENTS

| | | | |
|---|---|---|---|
| 10,037,613 B1 * | 7/2018 | Becker | .............. G06T 7/277 |
| 10,565,786 B1 * | 2/2020 | Klein | .............. G06F 3/04815 |
| 2018/0210087 A1 | 7/2018 | Olson et al. | |
| 2019/0384302 A1 * | 12/2019 | Silva | .............. G05D 1/0088 |

(Continued)

FOREIGN PATENT DOCUMENTS

EP     3549726 A2    10/2019

OTHER PUBLICATIONS

Hines, Tom; Stepanas, Kazys; Talbot, Fletcher; Sa, Inkyu; Lewis, Jake; Hernandez, Emili; Kottege, Navinda; Hudson, Nicolas, "Virtual Surfaces and Attitude Aware Planning and Behaviours for Negative Obstacle Navigation", Mar. 11, 2021, Robotics and Automation Letters, vol. 23, Issue 271, Part 1-1.

(Continued)

*Primary Examiner* — Vivek D Koppikar
*Assistant Examiner* — David Ruben Pedersen
(74) *Attorney, Agent, or Firm* — Goodwin Procter LLP

(57) ABSTRACT

The present invention relates to a system and method for use in navigating a vehicle within an environment, and in one particular example, to a system and method for navigation planning in an unstructured environment including unobservable features, such as negative obstacles and/or occluded regions.

15 Claims, 14 Drawing Sheets

(56) References Cited

U.S. PATENT DOCUMENTS

| | | | |
|---|---|---|---|
| 2020/0159227 A1 | 5/2020 | Cohen et al. | |
| 2020/0278681 A1* | 9/2020 | Gier | G06V 20/56 |
| 2022/0024485 A1* | 1/2022 | Theverapperuma | G06K 9/6257 |

OTHER PUBLICATIONS

A Stentz, J. Bares, T. Pilarski, and D. Stager, "The crusher system for autonomous navigation," AUVSIs Unmanned Systems North America, vol. 3, 2007.

Arnab Sinha, Panagiotis Papadakis, "Mind the gap: detection and traversability analysis of terrain gaps using LIDAR for safe robot navigation", Robotica, vol. 31, No. 7, p. 1085-1101, Cambridge University Press, 2013.

M. Bajracharya, J. Ma, M. Malchano, A. Perkins, A. A. Rizzi, and L. Matthies, "High fidelity day/night stereo mapping with vegetation and negative obstacle detection for vision-in-the-loop walking" in 2013 IEEE/RSJ International Conference on Intelligent Robots and Systems, 2013, pp. 3663-3670.

A. Hornung, K. M. Wurm, M. Bennewitz, C. Stachniss, and W. Burgard, "OctoMap: An efficient probabilistic 3D mapping framework based on octrees," Autonomous Robots, 2013.

"Online and Consistent Occupancy Grid Mapping for Planning in Unknown Environments" by P. Sodhi, B. Ho, and M. Kaess. In Proc. IEEE/RSJ Intl. Conf. on Intelligent Robots and Systems, IROS, (Macao), Nov. 2019, pp. 7879-7886.

R. B. Rusu and S. Cousins, "3d is here: Point cloud library (pcl)," in 2011 IEEE International Conference on Robotics and Automation, May 2011, pp. 1-4.

Pestana Puerta, J., Maurer, M., Muschick, D., Hofer, M., & Fraundorfer, F. (2019). Overview Obstacle Maps for Obstacle Aware Navigation of Autonomous Drones. Journal of Field Robotics, 36(4, Spec. Iss.), 734-762. https://doi.org/10.1002/rob.21863.

Fankhauser, Péter. (2018). Perceptive Locomotion for Legged Robots in Rough Terrain. 10.3929/ethz-b-000284254—ETH Zurich, Switzerland—https://www.research-collection.ethz.ch/handle/20.500.11850/284254.

J. Larson and M. Trivedi, "Lidar based off-road negative obstacle detection and analysis," 2011 14th International IEEE Conference on Intelligent Transportation Systems (ITSC), 2011, pp. 192-197, doi: 10.1109/ITSC.2011.6083105.

Dijkstra, E.W. A note on two problems in connexion with graphs. Numer. Math. 1, 269-271 (1959).

Rankin, A. L., Huertas, A., and Matthies, L. H., "Night-time negative obstacle detection for off-road autonomous navigation", Society of Photo-Optical Instrumentation Engineers (SPIE) Conference Series, 2007, vol. 6561.

David Harel, Statecharts: a visual formalism for complex systems, Science of Computer Programming, vol. 8, Issue 3, Jun. 1987, pp. 231-274.

Dolgov, Dmitri & Thrun, Sebastian & Montemerlo, Michael & Diebel, James. (2008). Practical Search Techniques in Path Planning for Autonomous Driving. AAAI Workshop—Technical Report, vol. 1001, No. 48105, pp. 18-80.

Kyohei Otsu, Guillaume Matheron, Sourish Ghosh, Olivier Toupet, Masahiro Ono—Fast approximate clearance evaluation for rovers with articulated suspension systems—2019, J. Field Robotics, vol. 37, No. 5, pp. 768-785.

Stanford Artificial Intelligence Laboratory et al., "Robotic operating system" [online] https://www.ros.org/.

Claudine Badue, Rânik Guidolini, Raphael Vivacqua Carneiro, Pedro Azevedo, Vinicius B. Cardoso, Avelino Forechi, Luan Jesus, Rodrigo Berriel, Thiago M. Paixão, Filipe Mutz, Lucas de Paula Veronese, Thiago Oliveira-Santos, Alberto F. De Souza, Self-driving cars: A survey, Expert Systems with Applications, vol. 165, Mar. 2021, 113816, ISSN 0957-4174.

Miller, Isaac & Campbell, Mark & Huttenlocher, Dan & Kline, Frank-Robert & Nathan, Aaron & Lupashin, Sergei & Catlin, Jason & Schimpf, Brian & Moran, Pete & Zych, Noah & Garcia, Ephrahim & Kurdziel, Mike & Fujishima, Hikaru. (2008). Team Cornell's Skynet: Robust perception and planning in an urban environment . . . J. Field Robotics. 25. 493-527.

Dave Ferguson, Thomas M. Howard, and Maxim Likhachev. 2008. Motion planning in urban environments. J. Field Robot. 25, 11-12 (Nov. 2008), 939-960.

C. Wang et al., "Autonomous mobile robot navigation in uneven and unstructured indoor environments," 2017 IEEE/RSJ International Conference on Intelligent Robots and Systems (IROS), 2017, pp. 109-116, doi: 10.1109/IROS.2017.8202145.

E. Shang, X. An, J. Li and H. He, "A novel setup method of 3D LIDAR for negative obstacle detection in field environment," 17th International IEEE Conference on Intelligent Transportation Systems (ITSC), 2014, pp. 1436-1441, doi: 10.1109/ITSC.2014.6957888.

M. F. A. Ghani and K. S. M. Sahari, "Detecting negative obstacle using kinect sensor," Int. J. Adv. Rob. Syst., vol. 14, No. 3, p. 1729881417710972, May 2017.

E. Shang, X. An, T. Wu, T. Hu, Q. Yuan, and H. He, "LiDAR Based Negative Obstacle Detection for Field Autonomous Land Vehicles," J. Field Robotics, vol. 33, No. 5, pp. 591-617, Aug. 2016.

R. D. Morton and E. Olson, "Positive and negative obstacle detection using the hld classifier," in 2011 IEEE/RSJ International Conference on Intelligent Robots and Systems, 2011, pp. 1579-1584.

L. Matthies and A. Rankin, "Negative obstacle detection by thermal signature," in Proceedings 2003 IEEE/RSJ International Conference on Intelligent Robots and Systems (IROS 2003) (Cat. No. 03CH37453), vol. 1, 2003, pp. 906-913 vol. 1.

M. Bosse, R. Zlot, and P. Flick, "Zebedee: Design of a spring-mounted 3D range sensor with application to mobile mapping," Robotics, IEEE Transactions on, vol. 28, No. 5, pp. 1104-1119, 2012.

J. P. Saarinen, H. Andreasson, T. Stoyanov, and A. J. Lilienthal, "3d normal distributions transform occupancy maps: An efficient representation for mapping in dynamic environments," the International Journal of Robotics Research, vol. 32, No. 14, pp. 1627-1644, 2013.

P. Fankhauser and M. Hutter, "A Universal Grid Map Library: Implementation and Use Case for Rough Terrain Navigation," in Robot Operating System (ROS)—The Complete Reference (vol. 1), A. Koubaa, Ed. Springer, 2016, ch. 5.

Z. Zhao and L. Bi, "A new challenge: Path planning for autonomous truck of open-pit mines in the last transport section," NATO Adv. Sci. Inst. Ser. E Appl. Sci., vol. 10, No. 18, p. 6622, Sep. 2020.

D. Dolgov, S. Thrun, M. Montemerlo, and J. Diebel, "Path planning for autonomous vehicles in unknown semi-structured environments," The International Journal of Robotics Research, vol. 29, No. 5, pp. 485-501, 2010.

K. Kurzer, "Path planning in unstructured environments: A real-time hybrid a* implementation for fast and deterministic path generation for the kth research concept vehicle," 2016.

M. Montemerlo, J. Becker, S. Bhat, H. Dahlkamp, D. Dolgov, S. Ettinger, D. Haehnel, T. Hilden, G. Hoffmann, B. Huhnke, D. Johnston, S. Klumpp, D. Langer, A. Levandowski, J. Levinson, J. Marcil, D. Orenstein, J. Paefgen, I. Penny, A. Petrovskaya, M. Pflueger, G. Stanek, D. Stavens, A. Vogt, and S. Thrun, "Junior: The Stanford Entry in the Urban Challenge," pp. 91-123, 2009.

Hines, T. et al., 'Virtual Surfaces and Attitude Aware Planning and Behaviours for Negative Obstacle Navigation', arXiv preprint arXiv:2010.16018 v1 (2020). [Published online Oct. 30, 2020].

Heckman, N. et al., "Potential negative obstacle detection by occlusion labeling," 2007 IEEE/RSJ International Conference on Intelligent Robots and Systems, San Diego, CA, 2007, pp. 2168-2173, doi: 10.1109/IROS.2007.4398970. [Published online Dec. 10, 2007].

* cited by examiner

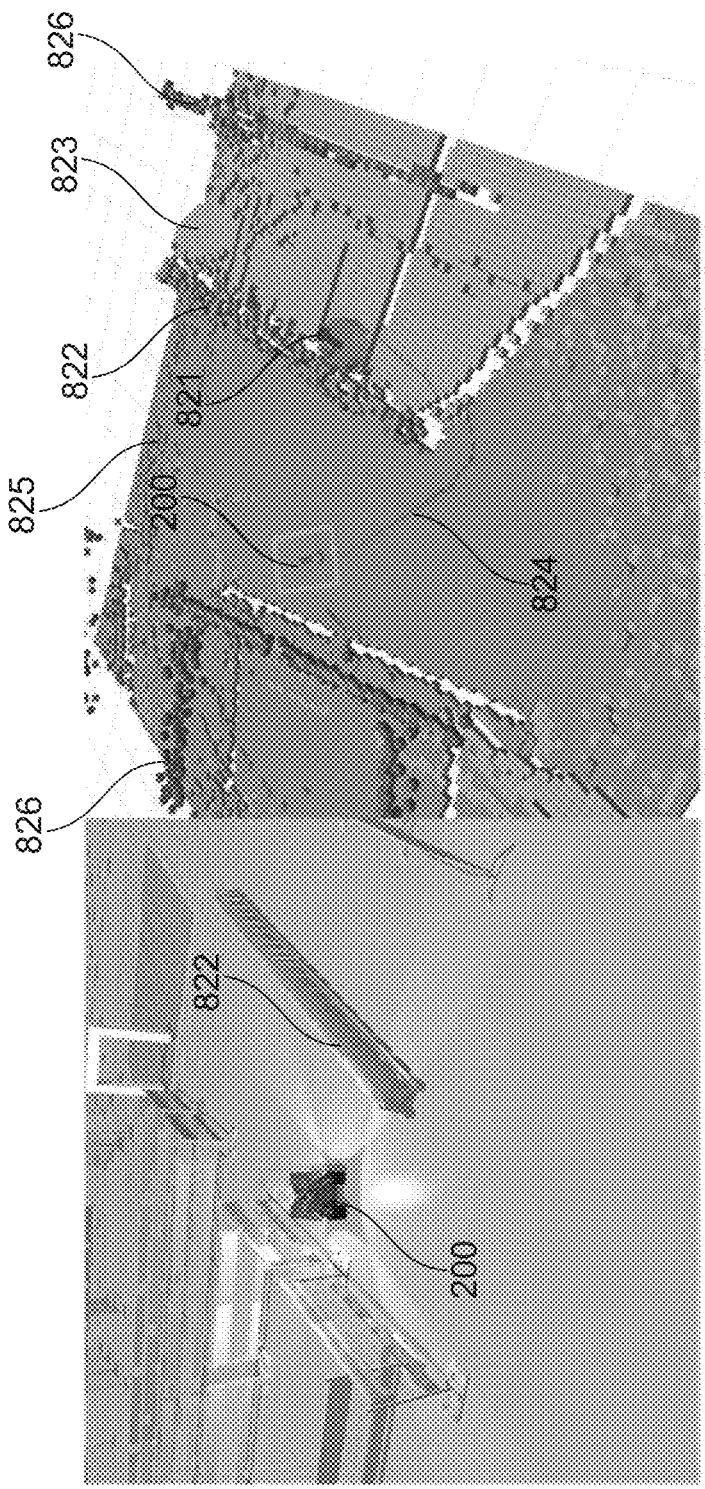

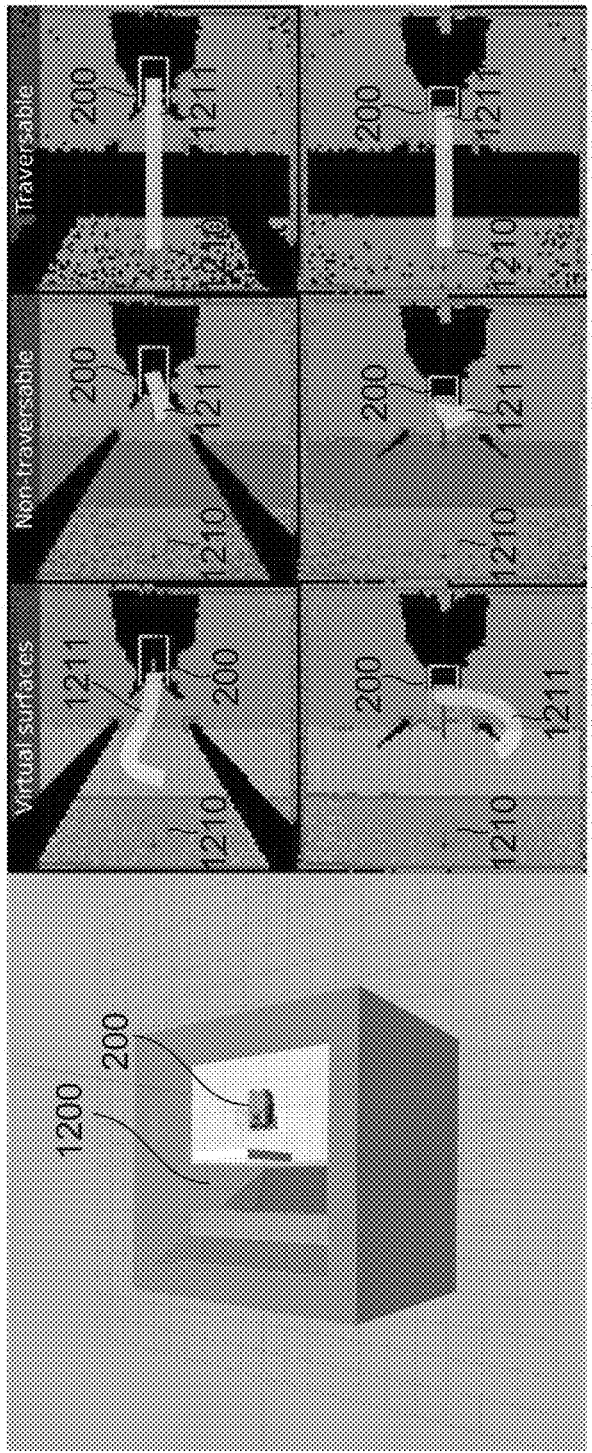

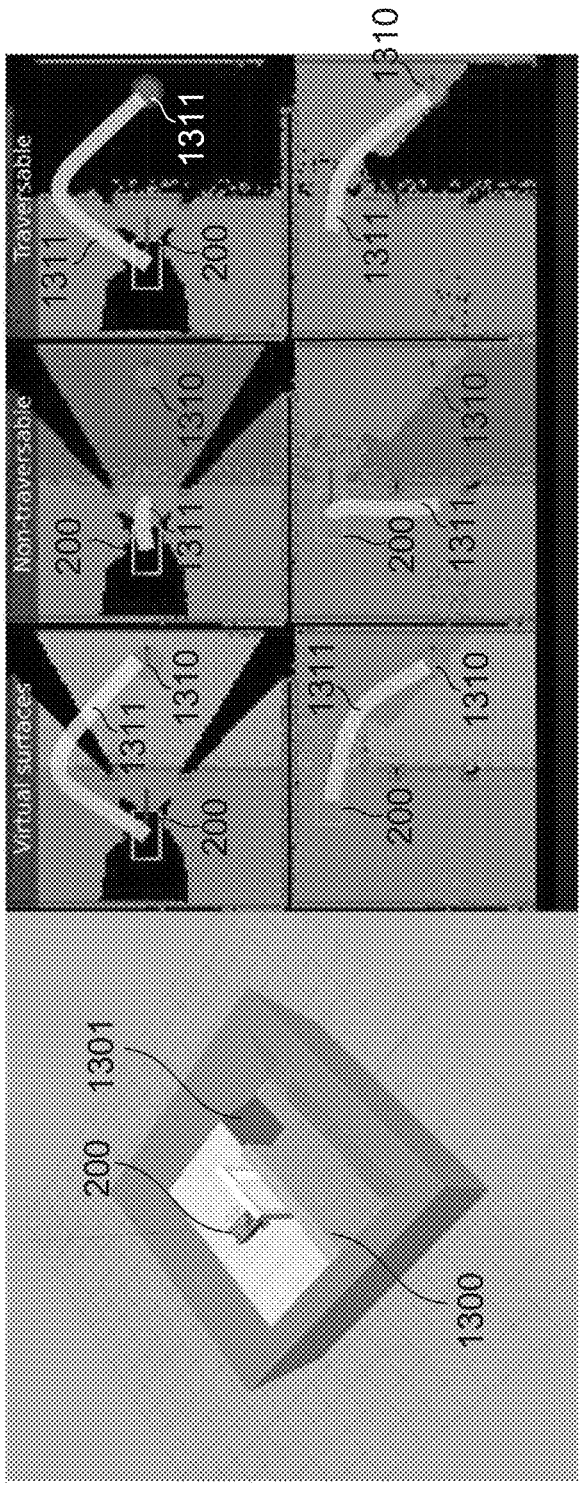

VEHICLE NAVIGATION

CROSS-REFERENCE TO RELATED APPLICATIONS

This patent application claims priority to and the benefit of Australian Patent Application Number 2020904756 entitled "Vehicle Navigation" filed on Dec. 21, 2020, the subject matter of which is incorporated by reference herein in its entirety.

BACKGROUND

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

Negative obstacles, such as cliffs, ditches, depressions, and/or occluded regions in an environment, pose a difficult problem for autonomous navigation, as is reported for example in A. Stentz, J. Bares, T. Pilarski, and D. Stager, "The crusher system for autonomous navigation," AUVSIs Unmanned Systems North America, vol. 3, 2007 or M. Bajracharya, J. Ma, M. Malchano, A. Perkins, A. A. Rizzi, and L. Matthies, "High fidelity day/night stereo mapping with vegetation and negative obstacle detection for vision-in-the-loop walking" in 2013 IEEE/RSJ International Conference on Intelligent Robots and Systems, 2013, pp. 3663-3670.

Negative obstacles are difficult to detect from vehicle mounted sensors as the near-field terrain occludes a drop, slope and/or trailing rising edge. Compared to a positive obstacle, occlusions and viewing angles result in fewer pixels-on-target, which in turn reduces the effective detection range, often to within the stopping distance of ground vehicles moving at any appreciable speed.

For vehicles capable of autonomously traversing extreme ramp angles (i.e. greater than) 45°, even slowly approaching a negative obstacle requires significant care in planning and sensor placement to ensure robust navigation: the obstacle must be approached from an optimal angle, so the system can observe down and determine if the terrain is a traversable ramp, or a fatal discontinuity. There are few examples of robotic systems capable of detecting and traversing negative obstacles in unstructured terrain, where the system can both detect and safely traverse gaps in the terrain by reasoning about the boundaries of the gap or unobserved region.

In order to effectively handle negative and positive obstacles it is important to have an efficient and precise height map representation, which encapsulates each grid cell's height with respect to an odometry coordinate to be used for estimating inclinations and terrain properties. The height map is used to derive a costmap (including positive and negative obstacles), which in turn is used to compute a trajectory to safely reach a goal, taking into account not only geometric details of paths but also the vehicle's kinematic constraints in order to generate feasible trajectories.

A. Hornung, K. M. Wurm, M. Bennewitz, C. Stachniss, and W. Burgard, "OctoMap: An efficient probabilistic 3D mapping framework based on octrees," Autonomous Robots, 2013, describes a popular library that makes use of probabilistic and 3D octree representation for memory efficiency. Octomap has had numerous successful deployments for various applications including underwater, flying, walking and ground robots.

Positive obstacles such as boxes or other robots can be effectively detected by computing eigenvectors of a small patch from the estimated height map, and the current vehicle's state, such as pose and surrounding meta information, as described in R. B. Rusu and S. Cousins, "3d is here: Point cloud library (pcl)," in 2011 IEEE International Conference on Robotics and Automation, May 2011, pp. 1-4. In contrast, negative obstacles are often unobservable (e.g. cliffs or ditches) and are inferred from gaps in the map, thus detection using geometric information is prevalent. Often depth data is accumulated into a voxel map, unobserved cells are computed and then classified as obstacles based on adjacent observed voxels.

M. F. A. Ghani and K. S. M. Sahari, "Detecting negative obstacle using kinect sensor," Int. J. Adv. Rob. Syst., vol. 14, no. 3, p. 1729881417710972, May 2017 and M. Bajracharya, J. Ma, M. Malchano, A. Perkins, A. A. Rizzi, and L. Matthies, "High fidelity day/night stereo mapping with vegetation and negative obstacle detection for vision-in-the-loop walking," use ray tracing over a 2D map to compute minimum possible slope and maximum (downward) step height of unobserved areas. E. Shang, X. An, J. Li, and H. He, "A novel setup method of 3D LIDAR for negative obstacle detection in field environment," 2014 and E. Shang, X. An, T. Wu, T. Hu, Q. Yuan, and H. He, "LiDAR Based Negative Obstacle Detection for Field Autonomous Land Vehicles," J. Field Robotics, vol. 33, no. 5, pp. 591-617, August 2016, use Lidar sensors with 3D ray tracing for determining occlusion and classifying obstacles using nearby observed voxels or classifying the points below the ray path with heuristics and Support Vector Machines (SVM).

R. D. Morton and E. Olson, "Positive and negative obstacle detection using the hld classifier," in 2011 IEEE/RSJ International Conference on Intelligent Robots and Systems, 2011, pp. 1579-1584 describes using Lidar based detection in 2D height maps by propagating information from all nearby observed cells to infer the unobserved terrain. Image based approaches are a far less common method for detecting negative obstacles, but thermal imagery has been exploited by observing that negative depressions remain warmer than surrounding terrain at night as described in L. Matthies and A. Rankin, "Negative obstacle detection by thermal signature," in Proceedings 2003 IEEE/RSJ International Conference on Intelligent Robots and Systems (IROS 2003) (Cat. No. 03CH37453), vol. 1, 2003, pp. 906-913 vol. 1.

SUMMARY OF THE PRESENT INVENTION

In one broad form an aspect of the present invention seeks to provide a method for use in navigating a vehicle within an environment, the method including in one or more electronic processing devices: acquiring range data from a range sensor mounted on the vehicle as the vehicle traverses the environment, the range data being indicative of a range between the range sensor and a sensed part of the environment; analysing the range data to generate: mapping data indicative of a three dimensional map of the environment; and, position data indicative of one or more range sensor positions within the environment; identifying occluded parts of the environment using the mapping and position data; generating a virtual surface based on the occluded parts of the environment; and, calculating a navigable path within the environment at least in part using the virtual surface.

In one broad form an aspect of the present invention seeks to provide a system for use in navigating a vehicle within an environment, the system including one or more electronic processing devices configured to: acquire range data from a range sensor mounted on the vehicle as the vehicle traverses the environment, the range data being indicative of a range between the range sensor and a sensed part of the environment; analyse the range data to generate: mapping data indicative of a three dimensional map of the environment; and, position data indicative of one or more range sensor positions within the environment; identify occluded parts of the environment using the mapping and position data; generate a virtual surface based on the occluded parts of the environment; and, calculate a navigable path within the environment at least in part using the virtual surface.

In one broad form an aspect of the present invention seeks to provide a computer program product for use in navigating a vehicle within an environment, the computer program product including computer executable code, which when executed by one or more suitable programmed electronic processing devices, causes the one or more processing devices to: acquire range data from a range sensor mounted on the vehicle as the vehicle traverses the environment, the range data being indicative of a range between the range sensor and a sensed part of the environment; analyse the range data to generate: mapping data indicative of a three dimensional map of the environment; and, position data indicative of one or more range sensor positions within the environment; identify occluded parts of the environment using the mapping and position data; generate a virtual surface based on the occluded parts of the environment; and, calculate a navigable path within the environment at least in part using the virtual surface.

In one embodiment the method includes in the one or more electronic processing devices controlling the vehicle at least in part using the navigable path to move the vehicle within the environment.

In one embodiment the method includes in the one or more electronic processing devices reducing a vehicle velocity as the vehicle approaches a virtual surface.

In one embodiment the method includes in the one or more electronic processing devices: using acquired range data to update the virtual surface as the vehicle moves within the environment; and, recalculating the navigable path at least in part using the updated virtual surface.

In one embodiment the method includes in the one or more electronic processing devices: generating a three-dimensional occupancy grid using the mapping data, the occupancy grid representing a location of sensed parts of the environment within a three dimensional volume; and, identifying occluded parts of the environment using the occupancy grid.

In one embodiment the method includes in the one or more electronic processing devices: using acquired range data to update the occupancy grid as the vehicle moves within the environment; and, recalculating the navigable path at least in part using updates the occupancy grid.

In one embodiment the method includes in the one or more electronic processing devices identifying occluded parts of the environment using projections between range sensor positions and corresponding sensed parts of the environment.

In one embodiment the method includes in the one or more electronic processing devices: populating an occupancy grid with occupied voxels using sensed parts of the environment; populating the occupancy grid with free voxels based on the projections; and, for each vertical column in the occupancy grid, populating the occupancy grid with a virtual surface voxel where: a free voxel is positioned above an unobserved voxel; and, there are no observed voxels below the free voxel.

In one embodiment the method includes in the one or more electronic processing devices: identifying a virtual surface based on adjacent virtual surface voxels; and, calculating the navigable path using virtual surfaces.

In one embodiment the method includes in the one or more electronic processing devices: calculating a gradient of the virtual surface; and, determining if the virtual surface is traversable based on the gradient.

In one embodiment the method includes in the one or more electronic processing devices, recalculating the virtual surface based on updates to an occupancy grid as the vehicle moves within the environment.

In one embodiment the method includes in the one or more electronic processing devices: determining a vehicle clearance; and, calculating the navigable path at least in part using the vehicle clearance.

In one embodiment the method includes in the one or more electronic processing devices: for a column in an occupancy grid, comparing the vehicle clearance to a height of continuous free voxels; and, determining if the column is traversable based on results of the comparison.

In one embodiment the method includes in the one or more electronic processing devices: generating a height map using a populated occupancy grid, the height map being indicative of surface heights within the environment; and, calculating the navigable path using the height map.

In one embodiment the method includes in the one or more electronic processing devices: generating a cost map indicative of cost associated with traversing parts of the environment; and, calculating the navigable path using the cost map.

In one embodiment the method includes in the one or more electronic processing devices, generating the cost map using a height map by labelling non-traversable obstacles in the height map.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which:

FIG. 8A is a schematic diagram of an example of a scenario in which a region is occluded by a positive obstacle;

FIG. 8B is a schematic diagram of an example of a cost map for the scenario of FIG. 8A;

FIG. 12A is a schematic diagram of an example of a vehicle approaching a fatal trench;

FIGS. 12B to 12G are schematic diagrams of example cost maps for approaches for the traversal of the fatal trench of FIG. 12A;

FIG. 13A is a schematic diagram of an example of a vehicle approaching a fatal trench with a navigable ramp; and, FIGS. 13B to 13G are schematic diagrams of example cost maps for approaches for the traversal of the fatal trench and navigable ramp of FIG. 13A.

DETAILED DESCRIPTION OF THE PREFERRED EMBODIMENTS

Figure 1:
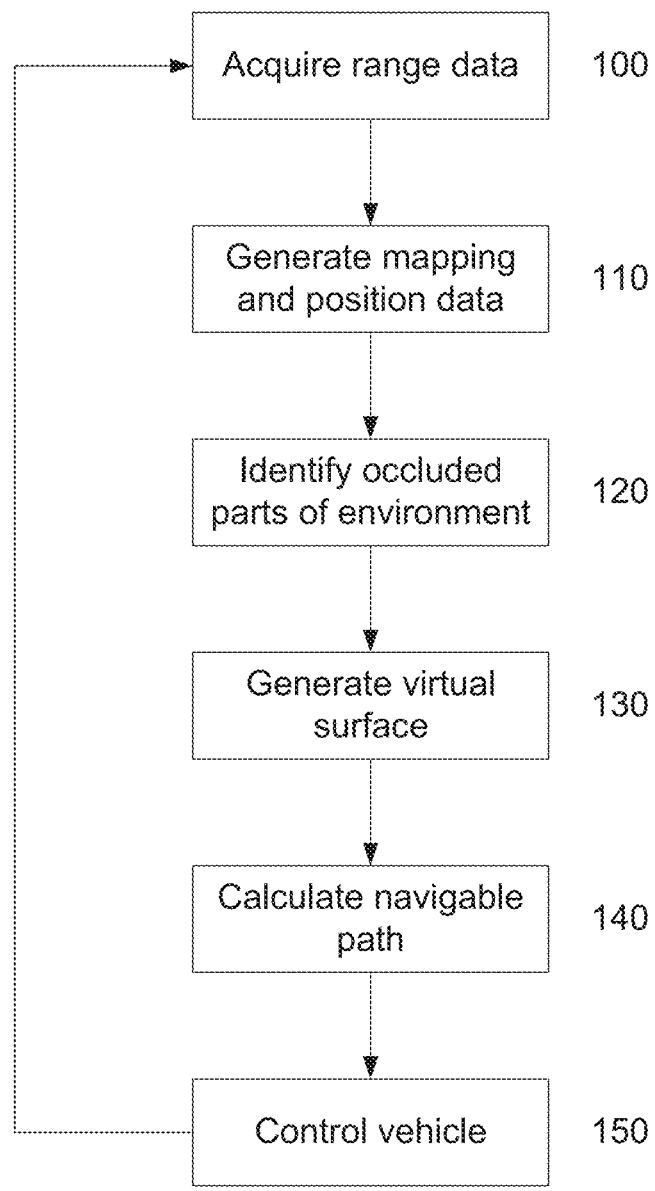
FIG. 1 is a flow chart of an example of a method of navigating a vehicle within an environment.

An example of a process for use in navigating a vehicle within an environment will now be described with reference to FIG. 1.

The environment is typically unstructured, and could be natural, including an open environment, such as an outdoor area, or confined environment, such as in a cave system or similar. The environment could additionally, and/or alternatively, be a constructed environment, such as a building, underground mine, or the like, or a combination of the natural and constructed environments.

For the purpose of this example, the vehicle is assumed to be any device capable of traversing an environment, and could include autonomous vehicles, robots, or the like. The vehicle could use a range of different locomotion mechanisms depending on the environment, and could include wheels, tracks, or legs. Accordingly, it will be appreciated that the term vehicle should be interpreted broadly and should not be construed as being limited to any particular type of vehicle.

Irrespective of the nature of the vehicle, the vehicle will typically include a range sensor, such as a LiDAR sensor, stereoscopic vision system, or the like. Additionally, each vehicle will typically include one or more electronic processing devices configured to receive signals from the range sensor and either process the signals, or provide these to a remote processing device for processing and analysis. In one specific example, this involves implementing a SLAM (Simultaneous Localisation and Mapping) type algorithm to perform simultaneous localisation and mapping. The processing device could be of any suitable form and could include a microprocessor, microchip processor, logic gate configuration, firmware optionally associated with implementing logic such as an FPGA (Field Programmable Gate Array), or any other electronic device, system or arrangement. This process can be performed using multiple processing devices, with processing being distributed between one or more of the devices as needed, so for example some processing could be performed onboard the vehicle, with other processing being performed remotely. Nevertheless, for the purpose of ease of illustration, the following examples will refer to a single processing device, but it will be appreciated that reference to a singular processing device should be understood to encompass multiple processing devices and vice versa, with processing being distributed between the devices as appropriate.

In this example, the navigation process involves acquiring range data from a range sensor mounted on the vehicle as the vehicle traverses the environment at step 100. The range data is indicative of a range between the range sensor and a sensed part of the environment.

At step 110, the processing device analyses the range data to generate mapping data indicative of a three dimensional map of the environment and position data indicative of one or more range sensor positions within the environment. The mapping data is typically indicative of a three dimensional representation of the environment, and may be in the form of a point cloud or similar, with the position data being indicative of a position of the range sensor within the environment, when respective range data is captured. The mapping and position data is generated by processing the range data collected by the range sensor, for example using a SLAM algorithm or similar.

At step 120, the processing device identifies occluded parts of the environment using the mapping and position data. In this regard, parts of a three-dimensional volume where the environment is present can be considered as occupied. Ray tracing from a range sensor position to a sensed part of the environment can then be used to identify intervening unoccupied, or "free" parts of the environment, with any parts of the environment that are not occupied or free, being considered as occluded. In one example, this process is performed using an occupancy grid and an example of this will be described in more detail below.

At step 130, the processing device generates a virtual surface based on the occluded parts of the environment, for example by combining adjacent occluded points to create a virtual surface. The resulting virtual surface can then be considered as a real surface in the context of path planning, allowing a navigable path within the environment to be calculated at least in part using the occluded parts of the environment at step 140. In one particular example, the planning process is performed by generating height and cost maps, with the navigable path being calculated using the resulting cost map, as will be described in more detail below.

Once the path has been created, this can be used to control the vehicle, so that the vehicle navigates within the environment at step 150. It will be appreciated that as the vehicle continues to move within the environment, additional range data is acquired, with this being used to repeat the above process. In particular as previously occluded parts of the environment are observed, this allows the processing device to update the virtual surfaces as the vehicle moves within the environment, allowing path planning to be refined to take into account the updated surface.

Accordingly, the above described process operates by using range data acquired from a range sensor to generate a map of the environment, which is then analysed to identify occluded parts of the environment. These are in turn used to derive virtual surfaces, which can be used as a potentially traversable surface in a navigation planning process. As the vehicle moves within the environment, additional data is collected, allowing the virtual surfaces to be refined, for example allowing these to be converted to real surfaces as the corresponding environment is detected, or assessed as being non-traversable, depending on the circumstances.

This approach provides for greater flexibility in path planning, and in particular avoids occluded parts of the environment being assessed as non-traversable, which would otherwise limit the ability of path planning to be successfully performed. This enables a greater range of traversable paths to be calculated, and consequently reduces the computation, time and manoeuvring required to successfully traverse an environment. Additionally, this significantly increases the likelihood of a traversable path being correctly identified, increasing the ability of vehicles to traverse unstructured environments, and reducing the potential for vehicles become stuck within an environment.

A number of further features will now be described.

Figure 2:
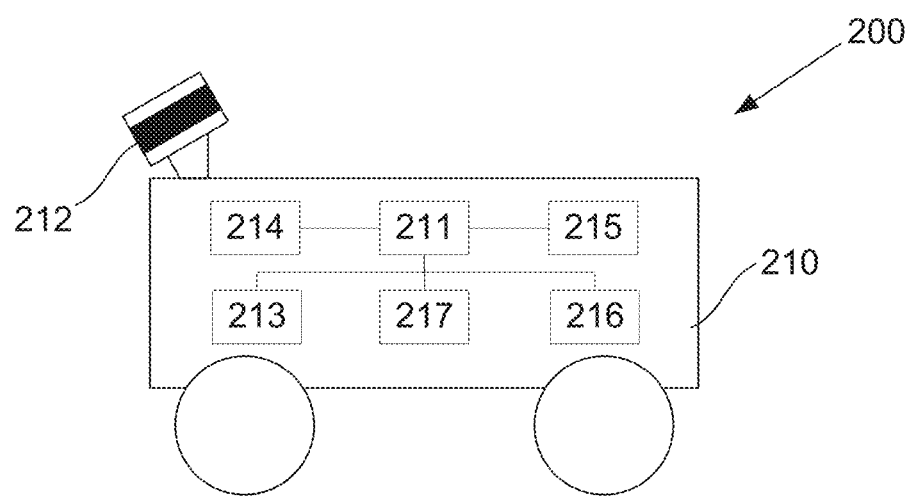
FIG. 2 is a schematic diagram of an example of a vehicle.

An example of a vehicle is shown in more detail in FIG. 2.

In this example, the vehicle 200 includes a chassis and body 210 having at least one electronic processing device 211 located on-board, which is coupled to a mapping system 212 configured to perform scans of the environment surrounding the vehicle in order to build up a 3D map (i.e. point cloud) of the environment. In one example, the mapping system includes a 3D LiDAR sensor such as a VLP-16 3D LiDAR produced by Velodyne. The processing device 211 may also be coupled to an inertial sensing device 213, such as an IMU (inertial measurement unit), a control system 214 to allow movement of the vehicle to be controlled, and one or more other sensors 215. This could include proximity sensors for additional safety control, or an imaging device, or similar, to allow images of the environment to be captured, for example, for the purpose of colourising point cloud representations of the environment.

The processing device 211 can also be connected to an external interface 216, such a wireless interface, to allow wireless communications with other vehicles, for example via one or more communications networks, such as a mobile communications network, 4G or 5G network, WiFi network, or via direct point-to-point connections, such as Bluetooth, or the like.

The electronic processing device 211 is also coupled to a memory 217, which stores applications software executable by the processing device 211 to allow required processes to be performed. The applications software may include one or more software modules, and may be executed in a suitable execution environment, such as an operating system environment, or the like. The memory 217 may also be configured to allow mapping data and frame data to be stored as required, as well as to store any generated map. It will be appreciated that the memory could include volatile memory, non-volatile memory, or a combination thereof, as needed.

It will be appreciated that the above described configuration assumed for the purpose of the following examples is not essential, and numerous other configurations may be used. For example, although the vehicle is shown as a wheeled vehicle in this instance, it will be appreciated that this is not essential, and a wide variety of vehicles and locomotion systems could be used.

Examples of obstructed features will now be described with reference to FIGS. 3A to 3C.

Figure 3A:
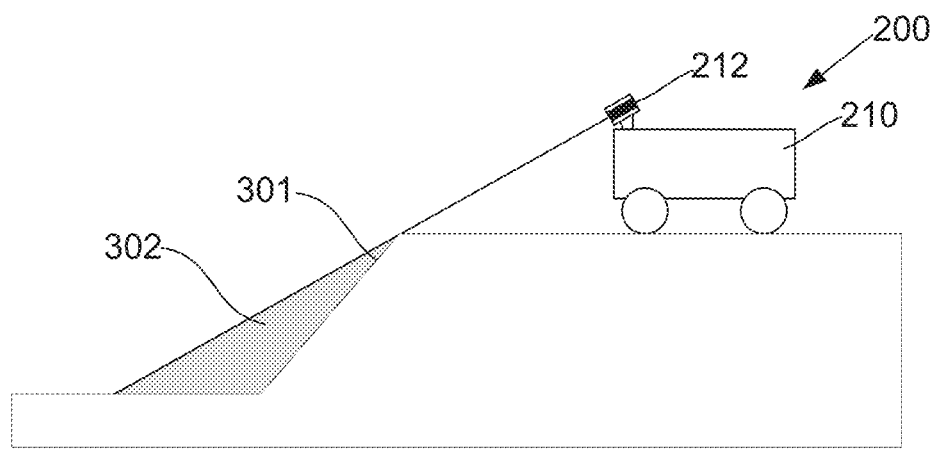
FIG. 3A is a schematic side view of an example of a vehicle approaching a negative obstacle.

In the example of FIG. 3A, a negative slope 301 is shown. In this example, as the vehicle 200 approaches the slope, the location of the position sensor 212 on the vehicle 200 prevents the slope being imaged directly, and instead an occluded region 302 arises. It will be appreciated that in this instance, as the vehicle approaches the slope 301, the size of the occluded region 302 will diminish, and if the slope is not too steep, eventually disappear when the slope surface is imaged. Accordingly, by treating the occluded region 302 as a virtual surface, this allows a path to be planned that approaches the slope, with the path being refined as the slope is detected and/or the virtual surface becomes too steep to traverse.

Figure 3B:
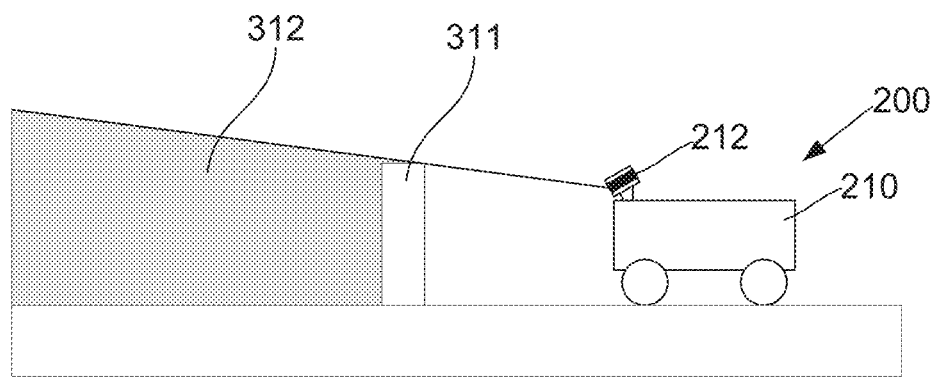
FIG. 3B is a schematic side view of an example of a vehicle approaching a region occluded by a positive obstacle.
Figure 3C:
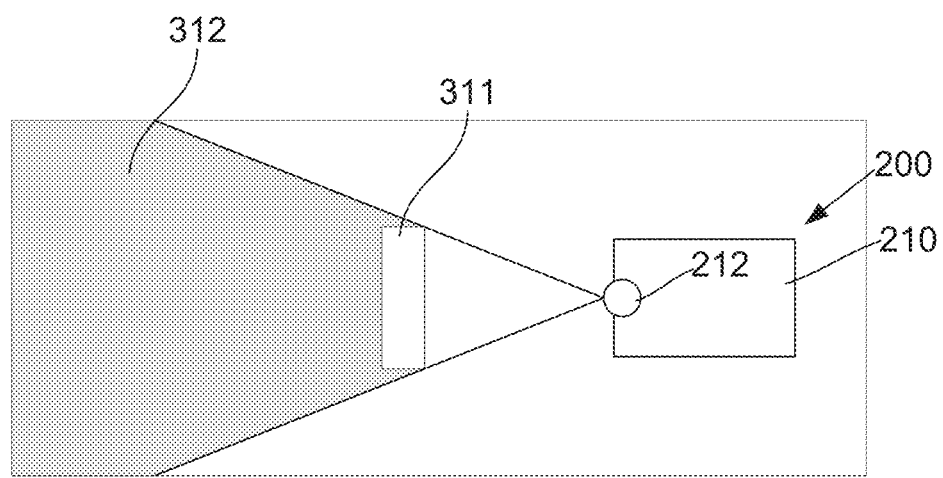
FIG. 3C is a schematic plan view of the example of FIG. 3B.

In the example of FIGS. 3B and 3C, a positive obstacle 311 obstructs a volume behind the obstacle, also leading to an occluded region 312. Again, by creating a virtual surface behind the positive obstacle 311, this allows the vehicle to approach this region by passing round the positive obstacle 311, in turn allowing the obstructed volume to be sensed.

In either case it will be appreciated that the processing device can control movement of the vehicle as the vehicle approaches a virtual surface, for example, by lowering a vehicle velocity, so that control of the vehicle can be adapted as the virtual surface is refined and/or a real surface is detected. This can be used to and/or redirect the vehicle in the event that the surface turns out to not be navigable.

In one example, the above described approach uses a three-dimensional occupancy grid that is generated by the processing device using the mapping data. The occupancy grid represents a location of sensed parts of the environment within a three dimensional volume, and typically includes a three-dimension grid of voxels, with each voxel being labelled based on whether or not the voxel is coincident with a detected part of the environment, for example, by labelling voxels aligned with the environment as occupied.

The processing device typically identifies non-occluded, and in particular free, parts of the environment using projections between range sensor positions and corresponding sensed parts of the environment. Thus, a ray traced between an occupied voxel and a range sensor position when the corresponding part of the environment was sensed, allows intervening voxels to be labelled as unoccupied or free. Accordingly, the occupancy grid can be initially populated with occupied voxels using sensed parts of the environment, with the occupancy grid being populated with free voxels based on the projections. Any remaining voxels are then considered to be unobserved or occluded, and can then be used in generating virtual surfaces.

Once the occupancy grid is populated, the grid is then further analysed to identify virtual surface voxels. This is typically achieved by identifying a boundary between free and unobserved voxels. For example, each column in the occupancy grid can be examined to convert unobserved voxels into virtual surface voxels where a free voxel is positioned above an unobserved voxel and there are no observed voxels below the free voxel.

Following this, the processing device can identify a virtual surface using adjacent virtual surface voxels, for example, by creating a surface spanning proximate virtual surface voxels, and then calculate the navigable path using the virtual surface. In one example, this involves treating the virtual surface as a real surface in a path planning algorithm, meaning the processing device will calculate a gradient of the virtual surface and determine if the virtual surface is potentially traversable based on the gradient.

As the vehicle moves within the environment, the process can be performed repeatedly, so the occupancy grid is updated as the vehicle moves within the environment. Thus, as new parts of the environment are sensed, the occupied and free voxels are updated, allowing the processing device to recalculate the virtual surface based on updates to the occupancy grid. Following this the path planning algorithm can refine the navigable path that is calculated. Thus, the processing device can use acquired range data to update the occupancy grid and recalculate the navigable path at least in part using the updated occupancy grid. For example, as a vehicle approaches a negative obstacle, such as a downward slope, visibility of the occluded region will increase as the vehicle approaches, allowing the potential gradient of the slope to be refined, in turn allowing for an improved assessment of whether the slope is navigable.

In addition to examining virtual surfaces, the processing device can also be configured to determine a vehicle clearance and calculate the navigable path at least in part using the vehicle clearance, thereby preventing the vehicle attempting to pass through a gap that is too low for the vehicle. Again, this step can be performed using the occupancy grid by comparing the vehicle clearance to a height of continuous free voxels, for respective columns in the occupancy grid, and then determining if the column is traversable based on results of the comparison. This advantageously allows the same occupancy grid to be used to account for unobservable features, as well a vehicle clearance.

In one example, the processing device generates a height map using the populated occupancy grid, with the height map being indicative of surface heights within the environment, including virtual surface heights. The height map can then be used in calculating the navigable path. In one particular example, this latter step is achieved by generating a cost map indicative of cost associated with traversing parts of the environment, using the height map, and then calculating the navigable path using the cost map. Thus, the height map will simply determine the height of various surfaces, whereas the cost map is generated by analysing the surfaces and determining whether or not these are navigable. For example, surfaces where the gradient is too steep for the vehicle to traverse, will be labelled as non-traversable, preventing this being used in path planning.

Figure 4A:
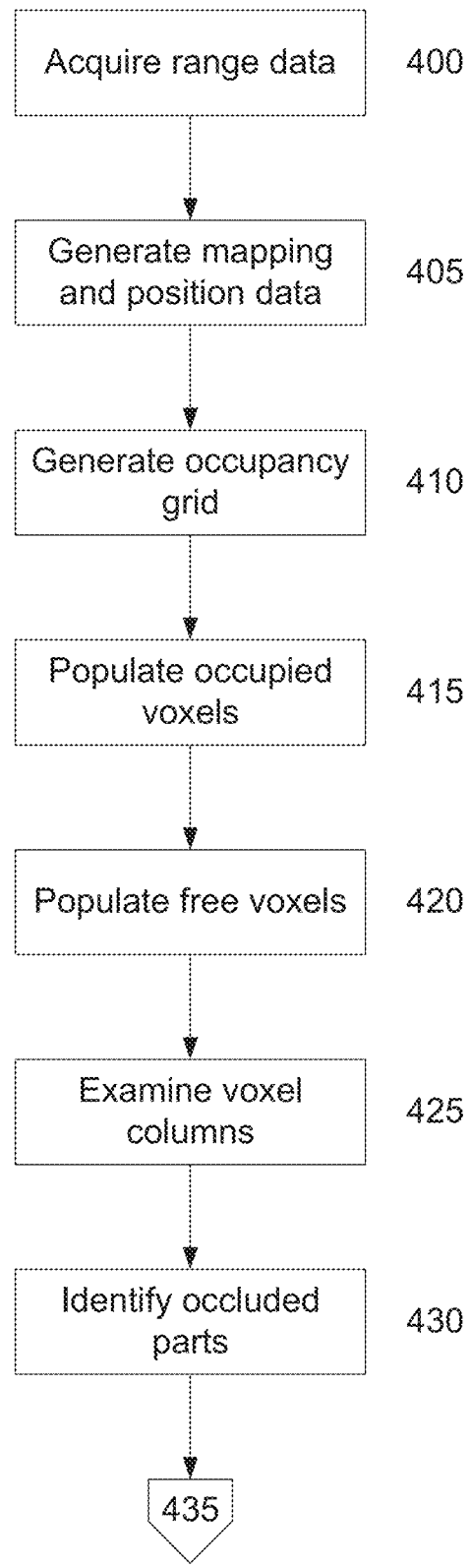
FIGS. 4A and 4B are a flow chart of a further example of a method for navigating a vehicle within an environment.
Figure 4B:
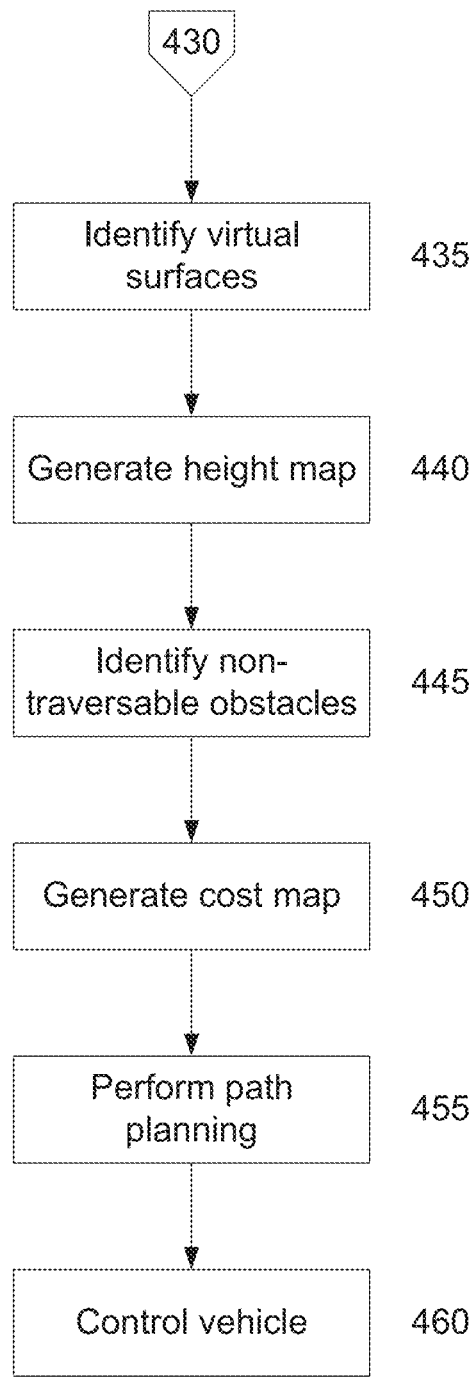

A further example of a path planning process will now be described in greater detail with reference to FIGS. 4A and 4B.

In this example, at step 400 range data is acquired, with mapping and position data being generated at step 405, in a manner substantially similar to that described above with respect to steps 100 and 110.

At step 410, a blank occupancy grid is generated, with each of the voxels labelled as unobserved. At step 415, the processing device then populates the grid with occupied voxels based on the location of sensed parts of the environment, effectively over writing the unobserved labelling with an occupied label where the voxels align with the sensed parts of the environment. Next, at step 420, the processing device performs ray tracing, extending a ray between the position of the range sensor and a part of the environment sensed when the range sensor was in that position. This is used to identify parts of the environment that are observed but unoccupied, with corresponding voxels being updated, and labelled as free. Once this step is complete, the occupancy grid should be fully populated with occupied, free and unobserved voxels.

At step 425, the processing device examines voxel columns in the occupancy grid, and for each column identifies if there are occluded parts of the environment at step 430, based on voxels that are labelled as unobserved. This is used to then identify virtual surfaces, with this being achieved by labelling a free voxel immediately above unobserved voxels as a virtual surface voxel at step 435. Having completed this process for all columns including unobserved voxels, the processing device uses the resulting occupancy grid to generate a height map at step 440, which is effectively a map of the height of any surfaces in the occupancy grid, including observed and virtual surfaces.

At step 445, the processing device analyses the height map and identifies any non-traversable surfaces, for example, examining surface gradients and comparing these to information regarding the ability of the vehicle to traverse different terrain. The height map is then populated with information regarding the whether surfaces are traversable or not to form a cost map at step 450. Thus, for surfaces that a non-traversable, these can be given an infinite cost, effectively ruling these out from being used as part of a navigable path. It will also be appreciated that in addition to a simple binary assessment of whether a surface is or is not traversable, the cost may might include additional levels of refinement, for example labelling surfaces based on how steep and potentially dangerous these might be to traverse.

Once generated, the processing device uses the cost map in calculating one or more navigable paths using a path planning algorithm at step 455. Such algorithms are known in the art and will be described in more detail below. Having calculated one or more paths, these can then be used to control the vehicle at step 460, allowing the vehicle to move within the environment. As the vehicle moves, this process can then be repeated as needed, allowing updated occupancy grids, height maps and cost maps to be generated, in turn allowing the path planning algorithm to recalculate paths as appropriate.

Further specific examples for path planning and vehicle control will now be described.

Specifically, the following presents an autonomous navigation system for vehicles, such as ground robots, traversing aggressive unstructured terrain through a cohesive arrangement of mapping, deliberative planning and reactive behaviour modules. This allows systems to be aware of terrain slope, visibility and vehicle orientation, enabling vehicles such as robots to recognize, plan and react around unobserved areas and overcome negative obstacles, slopes, steps, overhangs and narrow passageways.

In this example a virtual surface concept is used to estimate the best case slope within occluded regions of the environment, so that these best case slopes can be used when estimating traversal cost using the footprint of the robot. By updating virtual surfaces in real-time, while continuously planning and collecting data, negative obstacles can be safely approached and avoided if they are found to be unsafe.

In one example, the approach employs a 3D probabilistic voxel occupancy map that uses ray tracing for virtual surface construction, suitable for real-time robot navigation, and relevant data sets for evaluation, as well as a fast planner based on Hybrid A* algorithm, which uses the vehicle footprint to estimate and constrain the roll and pitch of the vehicle over the planned path. The planner also includes constraints to approach virtual surfaces (i.e. unobserved areas) from an optimal angle. Field trial results from urban and cave environments are also presented, demonstrating the ability to navigate negative obstacles in extreme terrain.

Methodologies

A. Sensing and SLAM Payload

The sensing payload used in the experiments described herein consists of a tilted Velodyne VLP-16 lidar on a rotating, encoder tracked mount, a Microstrain CV5-25 IMU and a custom timing board used for time synchronisation between sensors. This 0.5 Hz rotating lidar mount improves sensor coverage around the vehicle, while the tilt angle improves visibility of the ground in front of the vehicle and the lidar coverage density and diversity. The payload includes built-in compute consisting of a Jetson Xavier and is used to run custom SLAM software described in M. Bosse, R. Zlot, and P. Flick, "Zebedee: Design of a spring-mounted 3D range sensor with application to mobile mapping," Robotics, IEEE Transactions on, vol. 28, no. 5, pp. 1104-1119, 2012. The sensing payload is placed near the front of the vehicle, ensuring a downward field of view greater than the maximum ramp angle the vehicle can traverse.

The sensing payload publishes odometry and a raw lidar point cloud as Robotic Operating System (ROS) data streams. The pack also localises the points in the point cloud to account for the encoder rotation and lidar orientation. As a consequence, these points are published in the vehicle frame at approximately 290k points per second, depending on the environment, while the local odometry pose is updated at 100 Hz with higher accuracy poses generated in the data stream at approximately 4 Hz.

B. Mapping and Height Map Generation

The height map used to generate a base costmap is extracted from a 3D probabilistic voxel occupancy map. The occupancy map is generated from the combination of 3D lidar points and the local odometry output of the SLAM solution as described in CSIRO Data61 Robotics and Autonomous Systems, "Occupancy homogeneous map."

Each ray is integrated into the occupancy map using a technique which supports normal distribution transforms such as described in J. P. Saarinen, H. Andreasson, T. Stoyanov, and A. J. Lilienthal, "3d normal distributions transform occupancy maps: An efficient representation for mapping in dynamic environments," the International Journal of Robotics Research, vol. 32, no. 14, pp. 1627-1644, 2013, with these calculations performed in GPU. Each voxel is classified as being either occupied or free with a default state of unobserved. In one example, the map is generated at a 10 cm voxel resolution.

Since the occupancy map is generated from local SLAM odometry, the map is vulnerable to global misalignment errors. That is to say, this map does not consider any global optimisations such as those enacted by loop closure algorithms. This is addressed by only maintaining the occupancy map locally around the vehicle (~10 m×10 m) where misalignment errors will not be significant. However, it will be appreciated that this is not essential and global misalignment correction could instead be performed.

It is assumed the occupancy map is vertically aligned with the z-axis when generating the height map and examine individual voxel columns within the occupancy map. It is during height map generation that an additional voxel classification, virtual surface voxels, are created at an interface between free and unobserved space. Specifically, a virtual surface classification is assigned to free voxels which have an unobserved voxel immediately below. A virtual surface represents a best case surface in regions which are shadowed in the map and cannot be adequately observed. Virtual surface voxels are only used when there are no occupied voxel candidates within the search constraints of a column.

In addition to the voxel classification, it is also possible to impose a clearance constraint to ensure there is a vertical space large enough for the vehicle to fit through. For this constraint it is ensured there are sufficient free or unobserved voxels above each candidate voxel to meet the clearance constraint.

Figure 5:
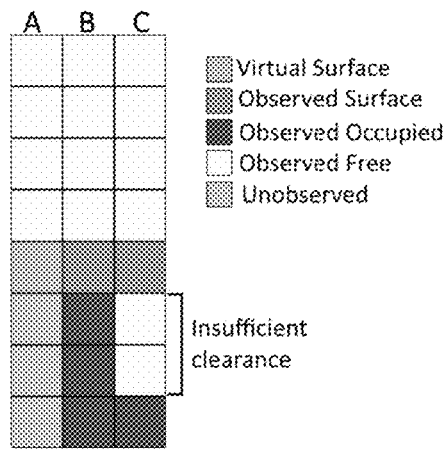
FIG. 5 is a schematic side view of example columns in an occupancy grid used for height map generation.

Three example occupancy grid columns considered for height map generation are shown from a side on view in FIG. 5. Column A depicts a virtual surface generated at the interface between known free and unobserved voxels. Columns B and C show known surfaces, where column C also shows a surface candidate rejected due to insufficient clearance.

Virtual surfaces are a key input to detecting negative obstacles. A virtual surface is any region of voxels in the height map consisting of virtual voxels as described above. A virtual surface represents a region of observational uncertainly and the best case slope for that region. Such surfaces will often arise from shadowing effects in sensor observations, but will also occur when real surface observations cannot be made, such as around black bodies and water.

Figure 6:
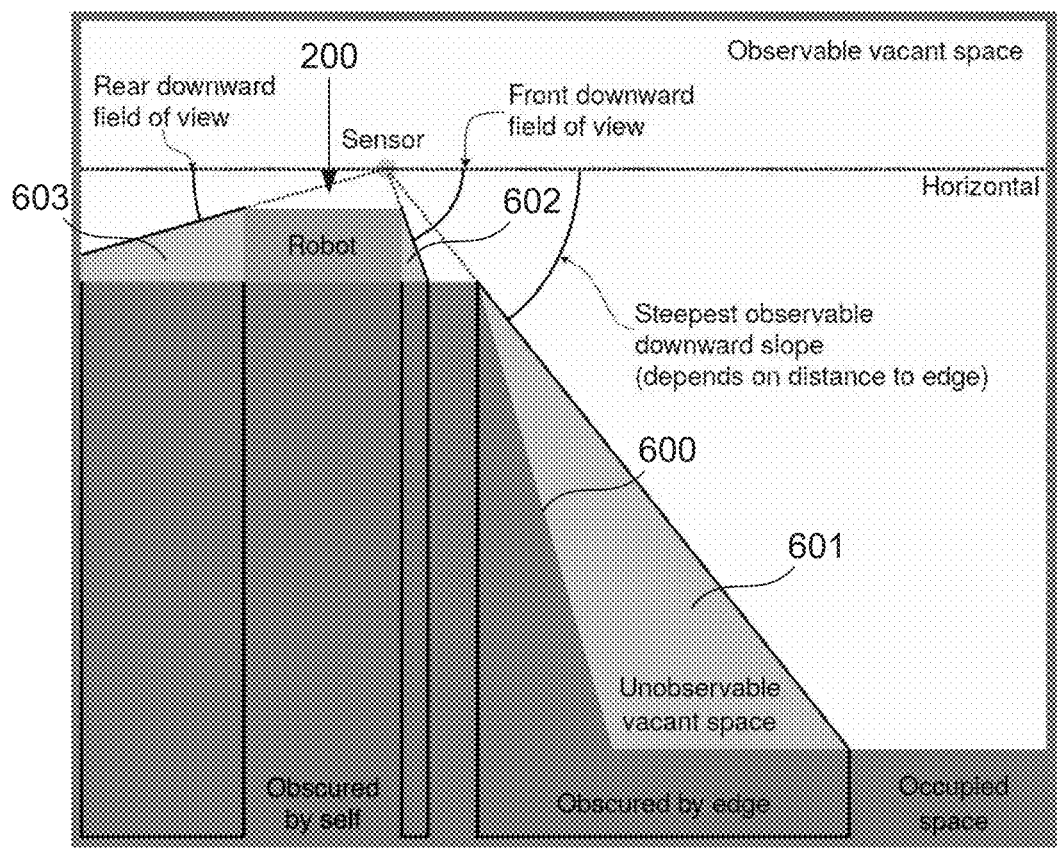
FIG. 6 is a schematic side view of an example of a vehicle near an edge of a negative obstacle.

Various occluded features are shown in FIG. 6, in which a vehicle 200 approaches a downward slope 600. This results in three occluded regions, including a first region 601 occluded by an upper edge of the slope, and second and third regions 602, 603, occluded by a front and rear of the vehicle respectively.

FIG. 6 illustrates two factors that impact observations of negative obstacles, namely that the downward field of view is much better in front of the vehicle 200 because the sensor is closer to the front edge of its body, and the maximum steepness of the downward slope that a robot is able to observe depends on the distance between the sensor and the edge of the slope as well as the height of the sensor.

Figures 7A, 7B, 7C:
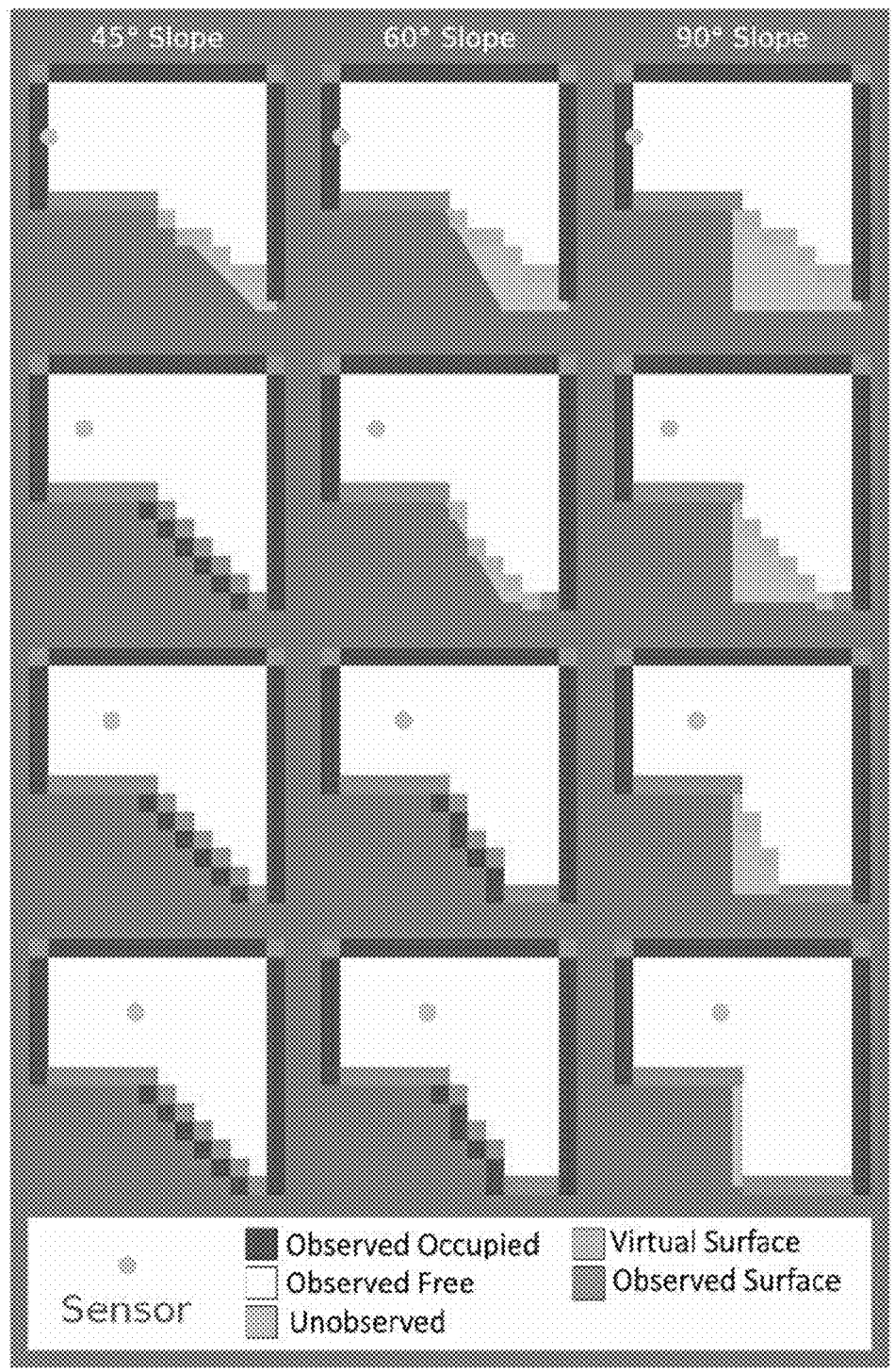
FIGS. 7A to 7C are schematic side views of example height maps generated by a vehicle progressively approaching the edges of negative obstacles of different steepness.

It will be appreciated that there is inherent uncertainty with using virtual surfaces, in that they are an upper bound for the surface beneath them, and hence the actual surface may be lower than the virtual surface. However, as a vehicle approaches the edge of the slope, real observations may be made and a real surface can be generated in the height map and an example of this is illustrated in FIGS. 7A to 7C, which show sequences of height maps generated when a vehicle including a sensor approaches a negative slope.

In this example, a virtual surface is initially generated when the vehicle is too far away from the edge to be able to observe the slope beyond it. As the vehicle approaches the edge, the slope of the virtual surface increases until the real slope is directly observed. There is a limit to the downward field of view, as described in FIG. 6, so that if the slope is steeper than the best downward field of view, then the virtual surface will continue to increase in steepness until it reaches that limit and no real observation of the slope will ever be made. The conclusion drawn is that a virtual surface cannot be confirmed as a negative obstacle until the vehicle is in close proximity to the potential surface and has sufficient downward field of view.

C. Costmap Generation

The occupancy grid produces a 2.5D height map that labels each cell as either real (observed), virtual (best case inferred) or unknown. Within this height map it is possible to identify obstacles that cannot be traversed in any possible way (e.g. the walls of a hallway). These obstacles are identified and labelled in the costmap.

Thus, the costmap contains the same information as the height map but with additional labels for non-fatal (possibly traversable) and fatal (definitely non-traversable) cells. Example cost maps are shown in FIGS. 8B and 9B, for the scenarios presented in FIGS. 8A and 9A, respectively.

In the example of FIGS. 8A and 8B, a vehicle 200 is assigned a target destination 821 behind a barrier 822. In this scenario, a virtual surface 823 is created by the shadow of a barrier 822, allowing a path 824 to be planned that approaches the destination. In this example, green cells 825 indicate observed and possibly traversable cells, magenta cells 826 are observed and fatal (non-traversable), and orange cells 823 denote the virtual surface.

Figures 9A, 9B:
FIG. 9A is a schematic diagram of an example of a scenario including a negative obstacle.
FIG. 9B is a schematic diagram of an example of a cost map for the scenario of FIG. 9A.

In the example of FIGS. 9A and 9B, a vehicle 200 is assigned a target destination at the base of a drop off 921, resulting in creation of a virtual surface 923, created by the shadow of the drop-off 921. Again, green cells 925 indicate observed and possibly traversable cells, magenta cells 926 are observed and fatal (non-traversable), and orange cells 923 denote the virtual surface.

Virtual surfaces are treated mostly as if they were real, observed surfaces. This is because they represent the best case slope (shallowest possible) they could contain. If the best case slope is traversable, then they can only be labelled as non-fatal (possibly traversable). If the best case slope is non-traversable then they should be labelled as fatal (definitely non-traversable). The exception to this is when virtual cells are caused by the shadow of positive obstacles such as in FIG. 8A. In this case the virtual surface should be left as non-fatal to allow for planning around the corner. For this reason, all virtual cells are labelled as non-fatal. Only the upper (higher elevation) end of slopes between cells are labelled as fatal. As a result, fatally steep virtual surfaces only lead to fatal costing where the virtual surface interfaces with real observations of a surface higher than them. This is a good description of the upper edge of a negative obstacle.

The current approach used the GridMap library described in P. Fankhauser and M. Huffer, "A Universal Grid Map Library: Implementation and Use Case for Rough Terrain Navigation," in Robot Operating System (ROS)—The Complete Reference (Volume 1), A. Koubaa, Ed. Springer, 2016, ch. 5, to arrange a series of filters to generate the costmap. Minor changes to GridMap were made in order to load parameters differently and make minor optimisations. The filter used to identify fatal obstacles was similar to the one used in Z. Zhao and L. Bi, "A new challenge: Path planning for autonomous truck of open-pit mines in the last transport section," NATO Adv. Sci. Inst. Ser. E Appl. Sci., vol. 10, no. 18, p. 6622, September 2020, with an added step to remove small concavities that the vehicle can easily traverse and to use vertical sections in three directions instead of four.

D. Path Planning Using Hybrid A*

A path planning approach was implemented using a variant of the hybrid A* algorithm described in D. Dolgov, S. Thrun, M. Montemerlo, and J. Diebel, "Path planning for autonomous vehicles in unknown semi-structured environments," The International Journal of Robotics Research, vol. 29, no. 5, pp. 485-501, 2010. The approach was used to generate kinematically feasible paths that handle the nearby obstacles and virtual surfaces appropriately. The following is an example A* path planner applied to the 3D kinematic state space of a vehicle. The algorithm inputs are the costmap, current vehicle position, a goal configuration $q_g = (x, y, \Psi) \in \mathbb{R}^3$ and a covariance which describes the tolerance of the goal.

The current hybrid A* approach is a heavily modified implementation based on the techniques described in K. Kurzer, "Path planning in unstructured environments: A real-time hybrid a* implementation for fast and deterministic path generation for the kth research concept vehicle," 2016. The approach dynamically generates a search graph based on a limited set of motion primitives that define the vehicle's motion constraints. While the search is performed on a discrete 3-dimension configuration space represented as grid, each cell contains the configuration defined in $\mathbb{R}^3$ to generate solutions that are not aligned to the grid.

The current approach employs a custom cost function definition, which allows transitioning between adjacent configurations $q_i$, $q_j$ taking into account the unstructured environment and the proposed virtual surfaces. It is defined as:

$$c_{i,j} = [\|q_{j_{xy}} - q_{i_{xy}}\| p_v + |q_{j_\psi} - q_{i_\psi}| p_w] P$$

where $p_v$, $p_w$ are the linear and angular velocity penalties respectively, and P is the cumulative set of additional penalties, which are platform specific. All individual penalty values in P are $[1, +\infty) \in \mathbb{R}$.

The most relevant of these penalties are:

Fatal penalty. If the footprint of the robot after the transition intersects with any fatal cells in the costmap, then the penalty (and transition cost) is $+\infty$.

Backwards and turning on spot penalties. If the transition ends with the robot depending on the support of a virtual surface and the motion primitive involves driving backwards or turning on the spot then the penalty is $+\infty$.

Roll and pitch penalties. Both attitude values are estimated using the robot footprint shape and the height map. If these are smaller in magnitude than a threshold then the penalty is 1. The penalty increases as the pitch or roll magnitudes increase up to a threshold. If the pitch or roll magnitudes exceed the threshold then the penalty is $+\infty$. If the pitch is negative (robot facing uphill) and the transition ends with the robot depending on the support of a virtual surface then the pitch and roll are considered to be 0 (flat). This is in order to ignore virtual positive obstacles such as in FIG. 8A.

This cost function enables hybrid A* to make use of any traversable virtual surfaces that help it reach the goal. From a distance, a virtual surface cannot be identified as traversable or non-traversable. By planning as if they are traversable the robot will approach virtual surfaces that could provide a helpful route. During the approach, if the virtual surface contains a fatal negative obstacle, the slope of the virtual surface will become fatally steep. In this situation the cost function returns an infinite cost to any plans that enter the virtual surface. Hybrid A* will then only generate routes to the goal that avoid the negative obstacle.

During this process, a local occupancy map is maintained indefinitely within a set distance of the vehicle, such as a radius of about 5 m, that that as the robot stays within 5 m of a negative obstacle, it will be remembered.

E. Behaviour Selector and Decision Making Policy

Ensuring safe traversal between two points is often a nontrivial task for mobile robots, especially in real-world scenarios, even with high-performance sensing, mapping, or planning. This is mainly due to high sensing uncertainty and unpredictable surroundings that the robot may interact with.

In one example, the current approach uses a rule-based and heuristically modelled behaviour selection approach similar to a Finite State Machine (FSM) described for example in M. Montemerlo, J. Becker, S. Bhat, H. Dahlkamp, D. Dolgov, S. Ettinger, D. Haehnel, T. Hilden, G. Hoffmann, B. Huhnke, D. Johnston, S. Klumpp, D. Langer, A. Levandowski, J. Levinson, J. Marcil, D. Orenstein, J. Paefgen, I. Penny, A. Petrovskaya, M. Pflueger, G. Stanek, D. Stavens, A. Vogt, and S. Thrun, "Junior: The Stanford Entry in the Urban Challenge," pp. 91-123, 2009.

State transitions are based on heuristically defined behaviour priority. For example, a de-collide behaviour will be activated when a vehicle determines it is stuck while attempting to follow a desired trajectory. The priority of the behaviours can be defined empirically via multiple field tests but the priority selection can be adapted to different environments or platforms.

A set of independent behaviours were used to generate velocity commands for the robot to execute. These behaviours run in parallel and each is designed to be activated for a specific task or in a specific situation. Each behaviour constantly monitors the current situation and outputs the velocity the robot should execute (admissibility). This behaviour system helps the robot handle unknown and unstructured environments in two major ways. Firstly, if a behaviour decides it is incapable of performing its task then control will be handed down to the next behaviour. Secondly, when a task or situation is encountered that no existing behaviour can handle, the need for a new behaviour can be identified. Adding a new behaviour has minimal impact on the rest of the system which reduces the probability of regression during development.

The nominal behaviour in this system is Path Follow, for tracking a given input path. The behaviour receives the input path and the pose of the vehicle and generates velocity commands to not only follow the path but also reactively speed up or slow down the robot based on the delta between current robot pitch and future desired robot pitch according to the approaching input path section. Effectively, this sees vehicles slow down whilst approaching a path section which starts to decline, speed up whilst approaching a path section which starts to incline and corrects vehicle velocity as it traverses a sloped path to avoid over rotation due to slip or obstacles in terrain such as rocks or individual steps in a staircase. Slowing down when approaching downward slopes is important as slowing down makes time for the sensing and processing of incrementally better observations that refine the virtual surface or reveal the real surface below it.

Path follow becomes inadmissible when the robot attempts movement that causes it to start to tip or roll over past a certain threshold. The orientation correction behaviour becomes admissible in this same condition. In this case control is seamlessly handed over from path follow to orientation correction. Orientation correction acts quickly based only on the robot's current orientation in order to prevent it from tipping or rolling over.

Figure 10:
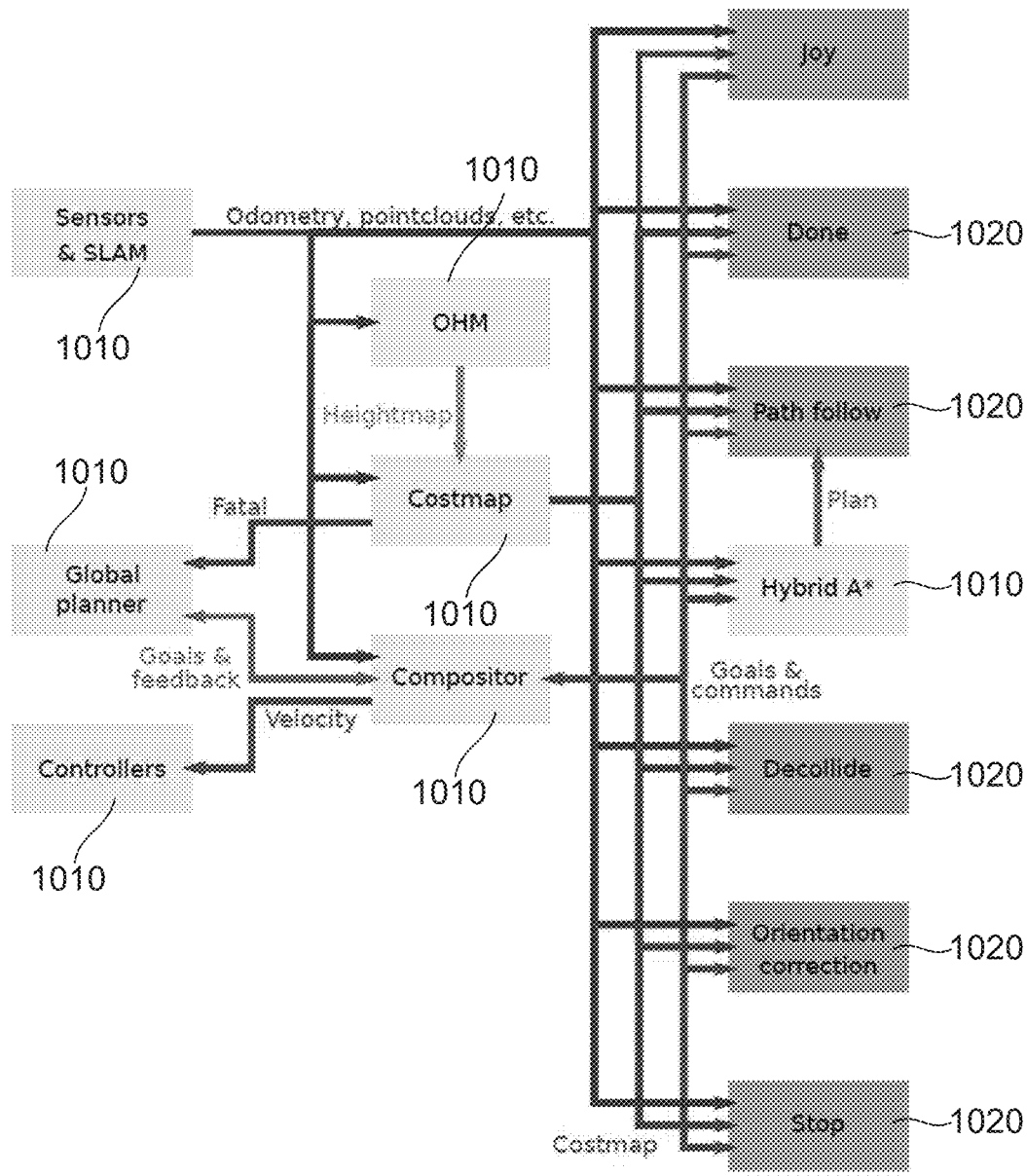
FIG. 10 is a schematic diagram of an example system architecture.

Most of the behaviours are self-explanatory, and known in the art. However, an overall system diagram of the proposed approach and data flow between each module is shown in FIG. 10. The boxes 1010 indicate individual modules and the boxes 1020 behaviours with the highest priority one at the top.

Experimental Results

Figures 11A, 11B, 11C, 11D, 11E, 11F, 11G, 11H:
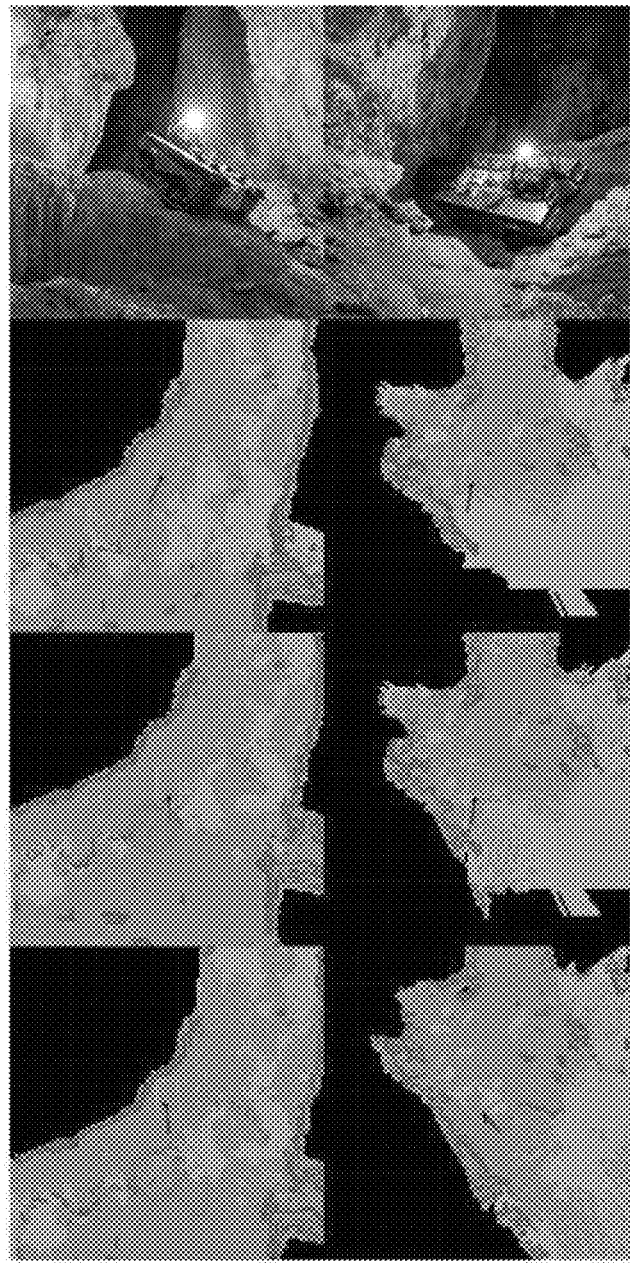
FIG. 11A is an image of an example of a vehicle approaching a first terrain including negative obstacles.
FIGS. 11B to 11D are schematic diagrams of a sequence of cost maps generated as the vehicle traverses the first terrain of FIG. 11A.
FIG. 11E is an image of an example of a vehicle approaching a second terrain including negative obstacles.
FIGS. 11F to 11H are schematic diagrams of a sequence of cost maps generated as the vehicle traverses the second terrain of FIG. 11E.
Figures 11I, 11J, 11K, 11L:
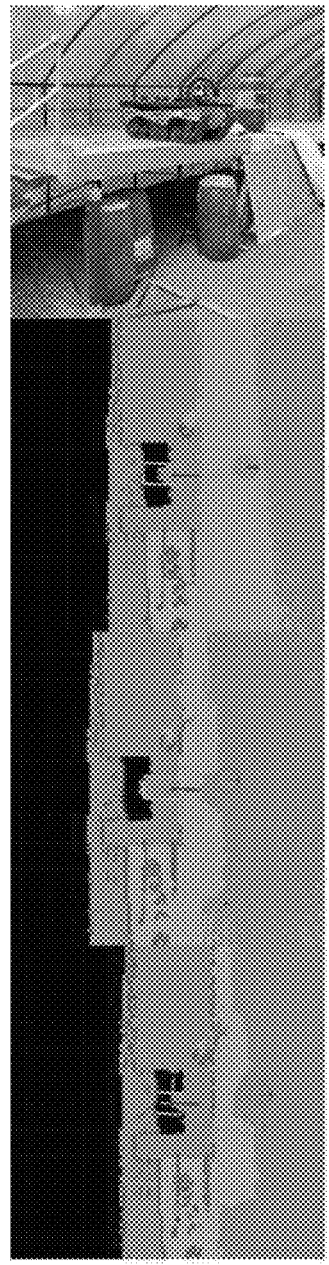
FIG. 11I is an image of an example of a vehicle approaching a third terrain including negative obstacles.
FIGS. 11J to 11L are schematic diagrams of a sequence of cost maps generated as the vehicle traverses the third terrain of FIG. 11I.

FIGS. 11A, 11E and 11I are contain photographs of a robot used as a test vehicle to test the methodology described herein. FIGS. 11B-11D, 11F-11H and 11J-11L show sample costmaps as different virtual surfaces were approached.

FIGS. 11B-11D depicts the robot approach the edge of a rock cliff with a traversable slope next to it. The goal was set to a position beyond the bottom of the cliff. Initially the cliff is represented by a traversable virtual surface. Hybrid A* generated a path to drive off the cliff. As it approached the virtual surface became steeper until it was non-traversable. After this, the robot backed up and hybrid A* generated a path to avoid the steepest part of the cliff.

FIGS. 11F-11H shows the robot approach a traversable downward slope. Initially the downward slope was virtual. During the approach the slope was observed and labelled as non-fatal, allowing this to be traversed.

FIGS. 11J-11L portrays the robot approaching the sharp edge of a platform. Again, hybrid A* initially planned a path off the edge. After getting close to the edge it was identified as non-traversable and the robot backed up and switched to a path that avoided it.

A. Performance Evaluation

A robot may become damaged during a fall if it fails to avoid a negative obstacle. A Gazebo based simulation was used so that failures were acceptable. The simulation included analogues for most of the components in the system. Notably it included models of the vehicle, sensor configuration and some environments. The vehicle model was geometrically accurate but made no attempt to emulate any dynamic mechanical components. The sensor model had a tilted and rotating Velodyne that closely emulated a real sensor configuration. The accuracy of the geometry and sensor models made this simulation a useful tool during development and testing. The most significant inaccuracy of the simulation was in the environmental models. These were polygonal and did not emulate the natural complexity and roughness of real environments.

FIGS. 12A and 13A contain images of simulated tests of two alternative scenarios. In these examples, vehicles 200 approach obstacles, include a trench 1200, and a barrier 1300 and slope 1301. Resulting cost maps are shown, with FIGS. 12B, 12C, 13B, 13C showing a virtual surface approach, whilst FIGS. 12D, 12E, 13D, 13E; 12F, 12G, 13F, 13G show obstacles treated as non-traversable and traversable, respectively. These cost maps show a goal 1210, 1310 and calculated path 1211, 1311.

When obstacles were considered traversable the non-traversable negative obstacle could not be handled, as shown in FIGS. 12F and 12G. This is because the vehicle cannot get any direct observations of the occluded vertical surface beyond the edge. The negative obstacle was always entirely virtual. Regardless of how close the vehicle approached the edge it could never directly observe the steepness of the negative obstacle below it. This resulted in the robot planning into the trench and falling.

When obstacles were considered non-traversable the planner never attempted to move toward the obscured downward ramp, as shown in FIGS. 13D and 13E. Reaching the goal required taking a detour down a ramp that could not be observed from the robot's starting position. As the virtual surface above the ramp was considered non-traversable, the robot never found a path to the goal. The robot only ever planned to the closest position within the space before the ramp and never observed or attempted traversal of the ramp.

When virtual surfaces were considered the best case slope for whatever lies below, both cases could be handled as shown in FIGS. 12B, 12C and 13B, 13C. In FIG. 12B, the vehicle approached the edge and identified the virtual surface as being representative of a non-traversable negative obstacle. In FIG. 13B the vehicle planned onto the virtual surface above the ramp, moved toward the ramp, observed the ramp, then planned down the ramp and to the goal.

Accordingly, the above described approach provides a simple yet efficient technique for generating a best case surface prediction in regions of poor sensor observation. These predictions have been named virtual surfaces and can be effectively costed in path planning to generate valid paths which first approach, then avoid such poorly observed regions. The above examples also demonstrate how negative obstacles can be inferred by the presence of virtual surfaces and how these surfaces change on approach. Practical testing has built confidence that this approach is capable of handling a variety of difficult terrain.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means ±20%.

Persons skilled in the art will appreciate that numerous variations and modifications will become apparent. All such variations and modifications which become apparent to persons skilled in the art, should be considered to fall within the spirit and scope that the invention broadly appearing before described.

What is claimed is:

1. A method for use in navigating a vehicle within an environment, the method including in one or more electronic processing devices:
   a) acquiring range data from a range sensor mounted on the vehicle as the vehicle traverses the environment, the range data being indicative of a range between the range sensor and a sensed part of the environment;
   b) analysing the range data to generate:
      i) mapping data indicative of a three dimensional map of the environment; and,
      ii) position data indicative of one or more range sensor positions within the environment;
   c) identifying occluded parts of the environment using the mapping and position data;
   d) generating a virtual surface, the virtual surface being a boundary between occluded parts of the environment and unoccupied parts of the environment;
   e) calculating a gradient of the virtual surface;
   f) determining if the virtual surface is traversable based on the gradient;
   g) calculating a navigable path within the environment at least in part using the virtual surface by considering the virtual surface as a real surface, wherein the navigable path traverses the virtual surface;
   h) controlling the vehicle at least in part using the navigable path to move the vehicle within the environment;
   i) using acquired range data to update the virtual surface as the vehicle moves within the environment; and,
   j) recalculating the navigable path at least in part using the updated virtual surface, wherein, where the gradient is too steep for the vehicle to traverse, the path will be labelled as non-traversable.

2. A method according to claim 1, wherein the method includes in the one or more electronic processing devices reducing a vehicle velocity as the vehicle approaches the virtual surface.

3. A method according to claim 1, wherein the method includes in the one or more electronic processing devices:
   a) generating a three-dimensional occupancy grid using the mapping data, the occupancy grid representing a location of sensed parts of the environment within a three dimensional volume; and,
   b) identifying occluded parts of the environment using the occupancy grid.

4. A method according to claim 3, wherein the method includes in the one or more electronic processing devices:
   a) using acquired range data to update the occupancy grid as the vehicle moves within the environment; and,
   b) recalculating the navigable path at least in part using updates the occupancy grid.

5. A method according to claim 1, wherein the method includes in the one or more electronic processing devices identifying occluded parts of the environment using projections between range sensor positions and corresponding sensed parts of the environment.

6. A method according to claim 5, wherein the method includes in the one or more electronic processing devices:
   a) populating an occupancy grid with occupied voxels using sensed parts of the environment;
   b) populating the occupancy grid with free voxels based on the projections; and,
   c) for each vertical column in the occupancy grid, populating the occupancy grid with a virtual surface voxel where:
      i) a free voxel is positioned above an unobserved voxel; and,
      ii) there are no observed voxels below the free voxel.

7. A method according to claim 6, wherein the method includes in the one or more electronic processing devices:
   a) identifying a virtual surface based on adjacent virtual surface voxels; and,
   b) calculating the navigable path using virtual surfaces.

8. A method according to claim 1, wherein the method includes in the one or more electronic processing devices, recalculating the virtual surface based on updates to an occupancy grid as the vehicle moves within the environment.

9. A method according to claim 1, wherein the method includes in the one or more electronic processing devices:
   a) determining a vehicle clearance; and,
   b) calculating the navigable path at least in part using the vehicle clearance.

10. A method according to claim 9, wherein the method includes in the one or more electronic processing devices:
    a) for a column in an occupancy grid, comparing the vehicle clearance to a height of continuous free voxels; and,
    b) determining if the column is traversable based on results of the comparison.

11. A method according to claim 1, wherein the method includes in the one or more electronic processing devices:
    a) generating a height map using a populated occupancy grid, the height map being indicative of surface heights within the environment; and,
    b) calculating the navigable path using the height map.

12. A method according to claim 1, wherein the method includes in the one or more electronic processing devices:
   a) generating a cost map indicative of cost associated with traversing parts of the environment; and,
   b) calculating the navigable path using the cost map.

13. A method according to claim 12 wherein the method includes in the one or more electronic processing devices, generating the cost map using a height map by labelling non-traversable obstacles in the height map.

14. A system for use in navigating a vehicle within an environment, the system including one or more electronic processing devices configured to:
   a) acquire range data from a range sensor mounted on the vehicle as the vehicle traverses the environment, the range data being indicative of a range between the range sensor and a sensed part of the environment;
   b) analyse the range data to generate:
      i) mapping data indicative of a three dimensional map of the environment; and,
      ii) position data indicative of one or more range sensor positions within the environment;
   c) identify occluded parts of the environment using the mapping and position data;
   d) generate a virtual surface, the virtual surface being a boundary between occluded parts of the environment and unoccupied parts of the environment;
   e) calculate a gradient of the virtual surface;
   f) determine if the virtual surface is traversable based on the gradient;
   g) calculate a navigable path within the environment at least in part using the virtual surface by considering the virtual surface as a real surface, wherein the navigable path traverses the virtual surface;
   h) control the vehicle at least in part using the navigable path to move the vehicle within the environment;
   i) use acquired range data to update the virtual surface as the vehicle moves within the environment; and,
   j) recalculate the navigable path at least in part using the updated virtual surface, wherein, where the gradient is too steep for the vehicle to traverse, the path will be labelled as non-traversable.

15. A non-transitory computer program product for use in navigating a vehicle within an environment, the computer program product including computer executable code, which when executed by one or more suitable programmed electronic processing devices, causes the one or more processing devices to:
   a) acquire range data from a range sensor mounted on the vehicle as the vehicle traverses the environment, the range data being indicative of a range between the range sensor and a sensed part of the environment;
   b) analyse the range data to generate:
      i) mapping data indicative of a three dimensional map of the environment; and,
      ii) position data indicative of one or more range sensor positions within the environment;
   c) identify occluded parts of the environment using the mapping and position data;
   d) generate a virtual surface, the virtual surface being a boundary between occluded parts of the environment and unoccupied parts of the environment;
   e) calculate a gradient of the virtual surface;
   f) determine if the virtual surface is traversable based on the gradient;
   g) calculate a navigable path within the environment at least in part using the virtual surface by considering the virtual surface as a real surface, wherein the navigable path traverses the virtual surface;
   h) control the vehicle at least in part using the navigable path to move the vehicle within the environment;
   i) use acquired range data to update the virtual surface as the vehicle moves within the environment; and,
   j) recalculate the navigable path at least in part using the updated virtual surface, wherein, where the gradient is too steep for the vehicle to traverse, the path will be labelled as non-traversable.

\* \* \* \* \*